Nov. 4, 1941.  T. WHEATLEY  2,261,535

PLUG VALVE ASSEMBLY

Filed Dec. 7, 1939

INVENTOR.
THOMAS WHEATLEY
BY
E. V. Hardway,
ATTORNEY.

Patented Nov. 4, 1941

2,261,535

UNITED STATES PATENT OFFICE 2,261,535

PLUG VALVE ASSEMBLY

Thomas Wheatley, Houston, Tex.

Application December 7, 1939, Serial No. 307,942

10 Claims. (Cl. 251—102)

This invention relates to a plug valve assembly.

An object of the invention is to provide a valve assembly of the character described particularly adapted for connection into a flow line for fluid and embodying a plurality of valves with novel means for actuating the valves into open or closed position and means for accurately and firmly seating the valves, when in closed position, to prevent leakage of fluid past them.

It is another object of the invention to provide in a valve assembly of the character described valve actuating means which will permit the valves to relax from their seated positions upon initial opening movement to minimize the friction of the valves with the valve casing during the opening movement of the valves.

It is a further object of the invention to provide a valve assembly of the character described wherein the valves and the valve actuating means are so mounted as to readily adjust themselves relative to each other and with the casing thus dispensing with the necessity of nice fits between the movable parts conducing to cheapness of manufacture and at the same time insuring accurate and close seating of the valves when the valves are in closed position.

It is another object of the invention to provide a valve assembly which may be readily dismembered for the easy substitution of new parts for parts that are worn and are to be discarded.

With the above and other objects in view the invention has particular relation to certain novel features of construction, operation and arrangement of parts, an example of which is given in this specification and illustrated in the accompanying drawing, wherein.

Figure 1:
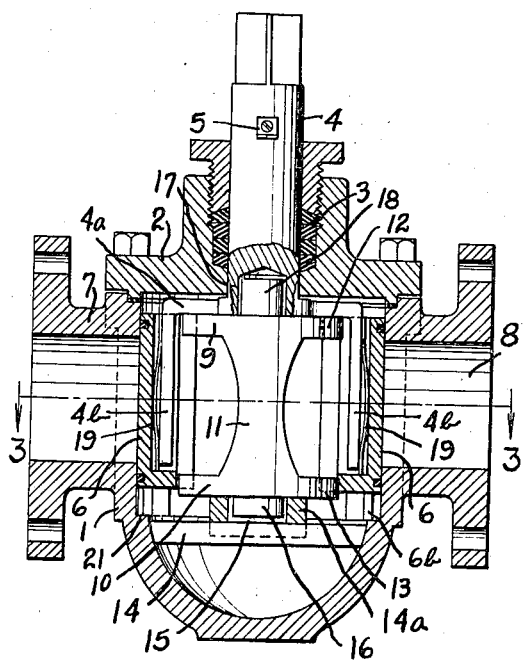
Figure 1 shows a longitudinal, sectional view of the valve.

Referring now more particularly to the drawing wherein like numerals of reference designate the same parts in each of the figures, the numeral 1 designates the valve casing, substantially cylindrical in form and closed in one end. Secured to the other end of the casing there is the valve cap 2 containing a stuffing box 3 forming a seal about the stem 4. The stem has an indicating pointer 5 fastened thereto to indicate whether the valves 6, 6 are in open or closed position. The valve casing has oppositely disposed, tubular, flanged extensions 7, 7 for the connection of adjacent sections of the flow line thereto. The casing also has a flowway 8 for the passage of the fluid. Within the casing there is a spider comprising the spaced end plates 9, 10 which are connected by the side bars 11, 11. The margins of the plates 9, 10 are formed with similar, but opposing cam faces 12, 12 and 13, 13, the faces 12 being in alignment with the corresponding faces 13.

In the casing beneath the spider there is a cross-bar 14, whose ends are anchored to the casing and secured on the cross-bar there is a bearing member 14a having, in its upper face, an oblong socket 15. The adjacent end plate 10 has an oblong boss 16 which is fitted loosely in said socket whereby the spider is held against turning.

The lower end of the stem 4 has a socket 17 in which the boss 18, outstanding from the plate 9, is loosely fitted. The spider, therefore, has a certain amount of lateral play relative to the casing.

The lower end of the stem 4 is formed with a yoke comprising the cross-bar 4a and the side arms 4b, 4b turned into parallel relation, and fitted into the inside longitudinal grooves 6a, 6a in the corresponding valves 6. Between the valves and the side arms 4b are the outwardly bowed flat springs 19 which take up the slack between the valves and the valve shifting arms.

As hereinbefore indicated the boss 16 holds the spider against turning but upon turning movement of the stem 4 the valves will be shifted to open or closed position.

Figure 3:
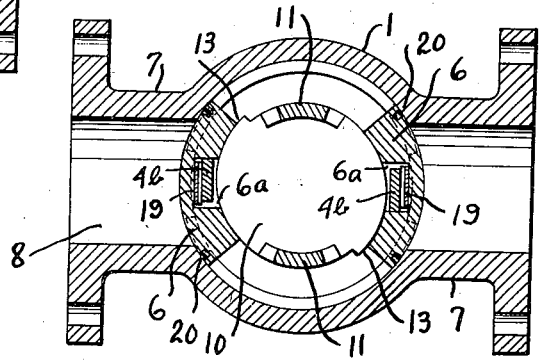
Figure 3 shows a longitudinal, sectional view taken on the line 3—3 of Figure 1, showing the valves in closed position.

The cams 12, 13 face toward the flowway 8 so that when the valves are shifted to closed position as shown in Figure 3 they will be wedged tightly between the cams and the inside seats of the casing around the flowway. It will be noted from an inspection of Figures 3 and 4 that the valves are arcuate in cross-section and their inner sides are slightly tapered to conform to the pitch of the cams so as to form a close fit with the valve casing when seated in closed position.

Figure 4:
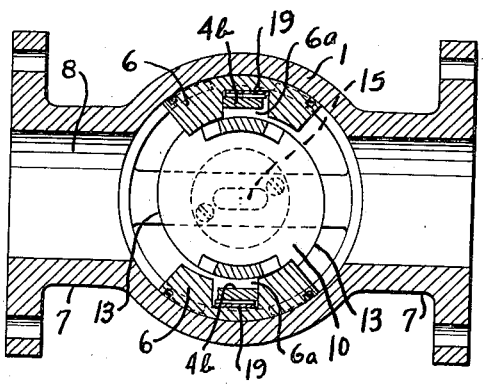
Figure 4 shows a similar view showing the valves in open position.
Figure 2:
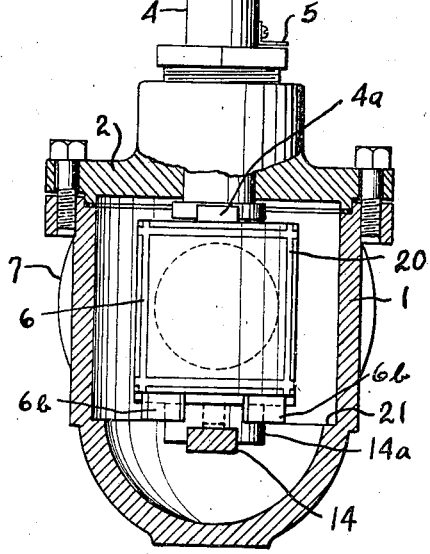
Figure 2 shows a transverse, sectional view thereof.
Figures 5, 6:
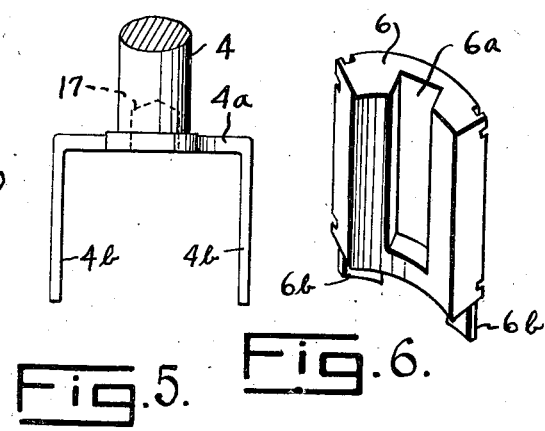
Figure 5 shows a fragmentary, side elevation of the yoke employed.
Figure 6 shows a perspective view of one of the valves.

The valves also have suitable sealing strips 20 countersunk into the external surfaces thereof as shown in Figures 2, 3 and 4 to form seals between the valves and the casing around the flowway. As hereinabove stated the spider has a certain amount of lateral play. This gives flexibility to the structure so that the cam plates 9, 10 may adjust themselves so that the cam faces will fit nicely against the inner sides of the valves when the valves are adjusted to closed position.

When the stem 4 is turned to open the valves, upon initial turning movement the cam faces will allow the valves to relax or move inwardly away from the inner side of the valve casing so as to minimize the friction of the valves with the casing upon completion of the turning movement toward open position. When moved to open position, as shown in Figure 4, the valves will clear the flowway 8 so as to give a full valve opening.

It will be noted that the valves 6 have the depending legs 6b which ride, during their turning movement, on the inside, annular shoulder 21 within the casing and thus support the valves in their proper position and minimize their friction with the casing.

The drawing and description are illustrative merely, while the broad principle of the invention will be defined by the appended claims.

What I claim is:

1. A valve assembly comprising a casing having a flowway therethrough, valves in the casing movable into registration with the flowway and into open position out of such registration, smooth face cams arranged to operate against the respective ends of the valves to force the valves into sealing engagement with the inside wall of the casing around the flowway when the valves are in closed position.

2. A valve assembly comprising a casing having a flowway therethrough, valves in the casing movable into registration with the flowway and into open position out of such registration, cams loosely mounted in the casing and arranged to operate against the respective ends of the valves to force the valves into sealing engagement with the inside wall of the casing around the flowway when the valves are in closed position and means accessible to an operator and loosely connected with each of the valves for shifting the valves.

3. A valve assembly comprising a valve casing having a flowway therethrough, a spider loosely mounted in the casing, means for holding the spider against rotation, valves mounted to revolve in the casing about the spider into and out of registration with the flowway, means loosely connected with each of the valves for shifting the valves, cams on the spider forming wedging means for wedging the valves in sealing relation with the casing around the flowway when the valves are so moved to closed position.

4. In a valve assembly having a casing provided with an inside, annular supporting shoulder and having a flowway therethrough; a pair of oppositely disposed valves having reduced legs supported on said shoulder and movable into and out of registration with the flowway, pairs of oppositely disposed cams arranged to operate against the respective ends of the valves to press the valves into sealing relationship with the casing around the flowway when the valves are in closed position.

5. In a valve assembly having a casing provided with an inside, annular supporting shoulder and having a flowway therethrough; a pair of oppositely disposed valves having reduced legs supported on said shoulder and movable into and out of registration with the flowway, pairs of oppositely disposed cams arranged to operate against the respective ends of the valves to press the valves into sealing relationship with the casing around the flowway when the valves are in closed position and means accessible to an operator and loosely connected to the valves for shifting the valves.

6. In a valve assembly having a casing provided with a flowway therethrough; a spider mounted loosely for radial movement in the casing, means for preventing rotation of the spider, pairs of oppositely disposed cams on the spider and spaced apart, valves movable relative to the cams into position to close the flowway and into open position, the cooperating parts of the valves and cams being shaped to press the valves into sealing relationship with the casing around the flowway when the valves are in closed position.

7. In a valve assembly having a casing provided with a flowway therethrough; a spider mounted loosely in the casing, means for preventing rotation of the spider, spaced pairs of oppositely disposed cams on the spider, valves movable relative to the cams into position to close the flowway and into open position, the cooperating parts of the valves and cams being shaped to press the valves into sealing relationship with the casing around the flowway when the valves are in closed position and means accessible to an operator and loosely connected to the valves for shifting the valves into open or closed position.

8. In a valve assembly having a casing and a flowway therethrough; a pair of oppositely disposed valves in the casing having inside grooves and movable into position to close the flowway and into open position, means accessible to an operator and including a yoke having side bars in said grooves for shifting the valves into open or closed position and means including cams in the casing arranged to co-act with the inside surface of the valves to press the valves into sealing relationship with the casing around the flowway when the valves are moved to closed position.

9. A valve assembly comprising a casing having a flowway therethrough, a pair of oppositely disposed valves supported in the casing and movable into and out of registration with the flowway, said valves having inside longitudinal grooves, a valve stem whose inner end is formed with a yoke, side arms carried by the yoke and fitted into the respective grooves whereby upon turning movement of the stem the valves may be moved into and out of registration with the flowway, a spider within the casing formed of spaced end plates and bars connecting the plates, said plates being located between the valves and having margins formed with similar opposing cam faces effective to cooperate with the valves to press the valves into sealing relationship with the casing around the flowway when the valves are in closed position.

10. A valve assembly comprising a casing having a flowway therethrough, a pair of oppositely disposed valves supported in the casing and movable into and out of registration with the flowway, said valves having inside longitudinal grooves, a valve stem whose inner end is formed with a yoke, side arms carried by the yoke and fitted into the respective grooves whereby upon turning movement of the stem the valves may be moved into and out of registration with the flowway, a spider within the casing formed of spaced end plates and bars connecting the plates, said plates being located between the valves and having margins formed with similar opposing cam faces effective to cooperate with the valves to press the valves into sealing relationship with the casing around the flowway when the valves are in closed position, and means at the ends of the spider for maintaining the spider approximately concentric with the casing and for holding the spider against turning but allowing a limited radial movement of the spider in the casing.

THOMAS WHEATLEY.